United States Patent
Edquist et al.

(10) Patent No.: US 10,780,991 B1
(45) Date of Patent: Sep. 22, 2020

(54) AIRCRAFT WINGLET LIGHT ASSEMBLY

(71) Applicant: B/E Aerospace, Inc., Winston-Salem, NC (US)

(72) Inventors: John D. Edquist, Milwaukee, WI (US); Glenn A. Johnson, Rural Hall, NC (US); Charles Martin Hansson, Winston-Salem, NC (US); Lawrence J. Cudzewicz, Greenfield, WI (US); Fernando J. Rentas, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/433,609

(22) Filed: Jun. 6, 2019

(51) Int. Cl.
  *B64D 47/02* (2006.01)
  *F21V 3/00* (2015.01)
  *B64C 3/26* (2006.01)
  *F21Y 115/20* (2016.01)

(52) U.S. Cl.
  CPC ............ *B64D 47/02* (2013.01); *B64C 3/26* (2013.01); *F21V 3/00* (2013.01); *F21Y 2115/20* (2016.08)

(58) Field of Classification Search
  CPC .. B64D 47/02–06; B64D 2203/00; B64C 3/26
  See application file for complete search history.

(56) References Cited

U.S. PATENT DOCUMENTS

| | | | | |
|---|---|---|---|---|
| 9,751,638 | B1 * | 9/2017 | Gagnon | B64D 47/02 |
| 2011/0019430 | A1 * | 1/2011 | Wilkinson | B64D 47/06 |
| | | | | 362/470 |
| 2019/0383462 | A1 * | 12/2019 | Schoen | F21S 43/26 |
| 2020/0094986 | A1 * | 3/2020 | Hessling-Von Heimendahl | |
| | | | | B64D 47/04 |

FOREIGN PATENT DOCUMENTS

EP 0298141 A1 * 1/1989 ............ B64D 39/00

* cited by examiner

*Primary Examiner* — Mariceli Santiago
(74) *Attorney, Agent, or Firm* — Suiter Swantz pc llo (57) ABSTRACT

An aircraft winglet light assembly is disclosed. The aircraft winglet light assembly includes an exterior skin coupled to an aircraft winglet of an aircraft. At least one interior surface of the exterior skin defines a cavity within the exterior skin. The aircraft winglet light assembly further includes one or more illumination sources housed within the cavity. The aircraft winglet light assembly further includes one or more sets of holes within the exterior skin. The one or more sets of holes are configured to allow illumination generated by the one or more illumination sources to pass through the exterior skin. The aircraft winglet light assembly further includes one or more protection elements proximate to the one or more sets of holes.

20 Claims, 10 Drawing Sheets

AIRCRAFT WINGLET LIGHT ASSEMBLY

BACKGROUND

In recent years, the automotive industry has implemented signature lighting elements (e.g., in the form of headlights, daytime running lights, fog lights, turn signals, taillights, and the like). These signature lighting elements provide additional aesthetic appeal while increasing the number of visual differentiators between automotive manufacturers and/or automotive consumers on the exterior of the automobile. In contrast to the automotive industry, the avionics industry has few readily discernible visual differentiators between avionics manufacturers and/or avionics consumers on the exterior of the aircraft.

SUMMARY

An aircraft winglet light assembly is disclosed. In one or more embodiments, the aircraft winglet light assembly includes an exterior skin coupled to an aircraft winglet of an aircraft. At least one interior surface of the exterior skin defines a cavity within the exterior skin. The aircraft winglet light assembly further includes one or more illumination sources housed within the cavity. The aircraft winglet light assembly further includes one or more sets of holes within the exterior skin. The one or more sets of holes are configured to allow illumination generated by the one or more illumination sources to pass through the exterior skin. The aircraft winglet light assembly further includes one or more protection elements proximate to the one or more sets of holes.

In some embodiments of the aircraft winglet light assembly, the aircraft winglet light assembly further includes one or more coated areas of electroluminescent paint.

In some embodiments of the aircraft winglet light assembly, at least a portion of an exterior surface of the aircraft winglet is covered in the one or more coated areas of electroluminescent paint.

In some embodiments of the aircraft winglet light assembly, the one or more coated areas of electroluminescent paint extend from the one or more sets of holes along the exterior surface of the aircraft winglet.

In some embodiments of the aircraft winglet light assembly, at least a portion of the exterior surface of the aircraft winglet and at least a portion of the exterior skin is covered in the one or more coated areas of electroluminescent paint.

In some embodiments of the aircraft winglet light assembly, the one or more coated areas of electroluminescent paint include at least two coated areas of electroluminescent paint.

In some embodiments of the aircraft winglet light assembly, a first coated area of the at least two coated areas of electroluminescent paint is contoured to map to a second coated area of the at least two coated areas of electroluminescent paint.

In some embodiments of the aircraft winglet light assembly, the one or more coated areas of electroluminescent paint are proximate to the one or more protection elements.

In some embodiments of the aircraft winglet light assembly, the one or more sets of holes within the exterior skin include at least three sets of holes.

In some embodiments of the aircraft winglet light assembly, a first spacing between a first adjacent pair of the at least three sets of holes within the exterior skin is different from a second spacing between a second adjacent pair of the at least three sets of holes within the exterior skin.

In some embodiments of the aircraft winglet light assembly, the one or more sets of holes are fabricated in a pre-defined pattern.

In some embodiments of the aircraft winglet light assembly, a particular section of at least one section of a protection element of the one or more protection elements is configured to cover a particular set of the one or more sets of holes.

In some embodiments of the aircraft winglet light assembly, the one or more protection elements include a tape configured to cover the one or more sets of holes.

In some embodiments of the aircraft winglet light assembly, at least one diffusion element is positioned proximate to the one or more illumination sources within the cavity defined by the exterior skin.

In some embodiments of the aircraft winglet light assembly, the at least one diffusion element is positioned between the one or more illumination sources and the one or more sets of holes within the cavity defined by the exterior skin.

In some embodiments of the aircraft winglet light assembly, the one or more illumination sources are coupled to a controller. The controller is configured to at least one of activate or deactivate the one or more illumination sources.

A system is also disclosed. In one or more embodiments, the system includes an aircraft winglet of an aircraft. The system further includes an aircraft winglet light assembly. The aircraft winglet light assembly includes an exterior skin coupled to the aircraft winglet of the aircraft. At least one interior surface of the exterior skin defines a cavity within the exterior skin. The aircraft winglet light assembly further includes one or more illumination sources housed within the cavity. The aircraft winglet light assembly further includes one or more sets of holes within the exterior skin. The one or more sets of holes are configured to allow illumination generated by the one or more illumination sources to pass through the exterior skin. The aircraft winglet light assembly further includes one or more protection elements proximate to the one or more sets of holes. The system further includes one or more coated areas of electroluminescent paint. At least a portion of at least one of an exterior surface of the aircraft winglet or the exterior skin is covered in the one or more coated areas of electroluminescent paint.

In some embodiments, the system further includes a controller coupled to the one or more illumination sources of the aircraft winglet light assembly. The controller is configured to at least one of activate or deactivate the one or more illumination sources.

A system is also disclosed. In one or more embodiments, the system includes an aircraft winglet of an aircraft. The system further includes an aircraft winglet light assembly. The aircraft winglet light assembly includes an exterior skin coupled to the aircraft winglet of the aircraft. At least one interior surface of the exterior skin defines a cavity within the exterior skin. The aircraft winglet light assembly further includes one or more illumination sources housed within the cavity. The aircraft winglet light assembly further includes one or more sets of holes within the exterior skin. The one or more sets of holes are configured to allow illumination generated by the one or more illumination sources to pass through the exterior skin. The aircraft winglet light assembly further includes one or more protection elements proximate to the one or more sets of holes. The system further includes a controller coupled to the one or more illumination sources of the aircraft winglet light assembly. The controller is configured to at least one of activate or deactivate the one or more illumination sources.

In some embodiments, the system further includes one or more coated areas of electroluminescent paint. At least a portion of at least one of an exterior surface of the aircraft winglet or the exterior skin is covered in the one or more coated areas of electroluminescent paint.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-6B generally illustrate a system 100 including an aircraft winglet light assembly 102. It is noted herein that "aircraft winglet light assembly 102" and variants of the term "aircraft winglet light assembly 102" (e.g., "winglet light assembly 102", "light assembly 102", "assembly 102", or the like) may be considered equivalent for purposes of the present disclosure.

The system 100 may include an aircraft winglet 104 coupled to an aircraft (e.g., an aircraft 308, as illustrated in FIGS. 3A-4B). The system 100 may include a landing light 106 coupled to the aircraft winglet 104. For example, the aircraft winglet light assembly 102 may be positioned proximate to the landing light 106 on the aircraft winglet 104.

The aircraft winglet light assembly 102 may be coupled to the aircraft winglet 104. For example, the aircraft winglet light assembly 102 may be coupled to the aircraft winglet 104 in such a way that the aircraft winglet light assembly 102 is at least a portion of a leading edge (e.g., a forward-facing edge) of the aircraft winglet 104. By way of another example, the aircraft winglet light assembly 102 may be coupled to an upward-facing surface of the aircraft winglet 104.

Figure 1:
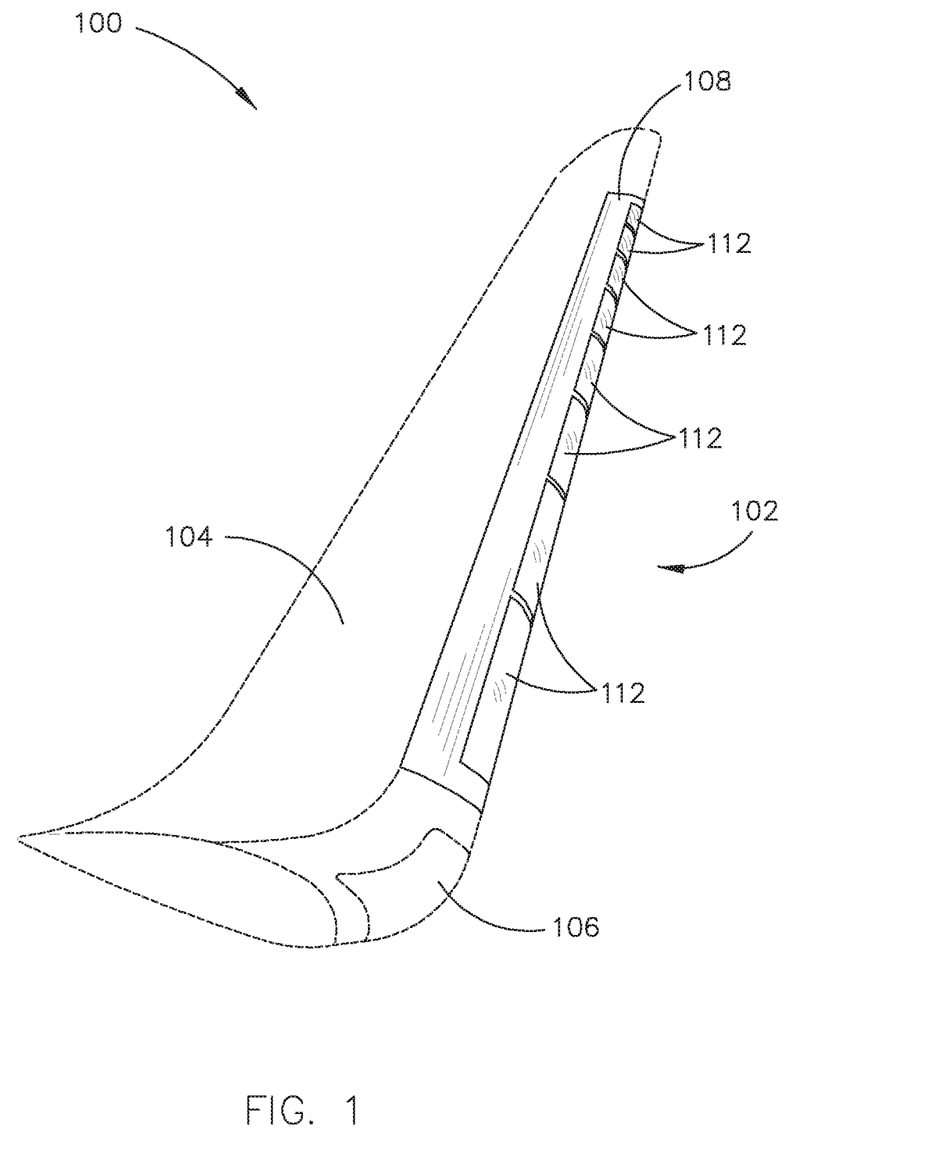
FIG. 1 is a perspective view of a system including an aircraft winglet light assembly, in accordance with one or more embodiments of the disclosure.
Figures 2A, 2B:
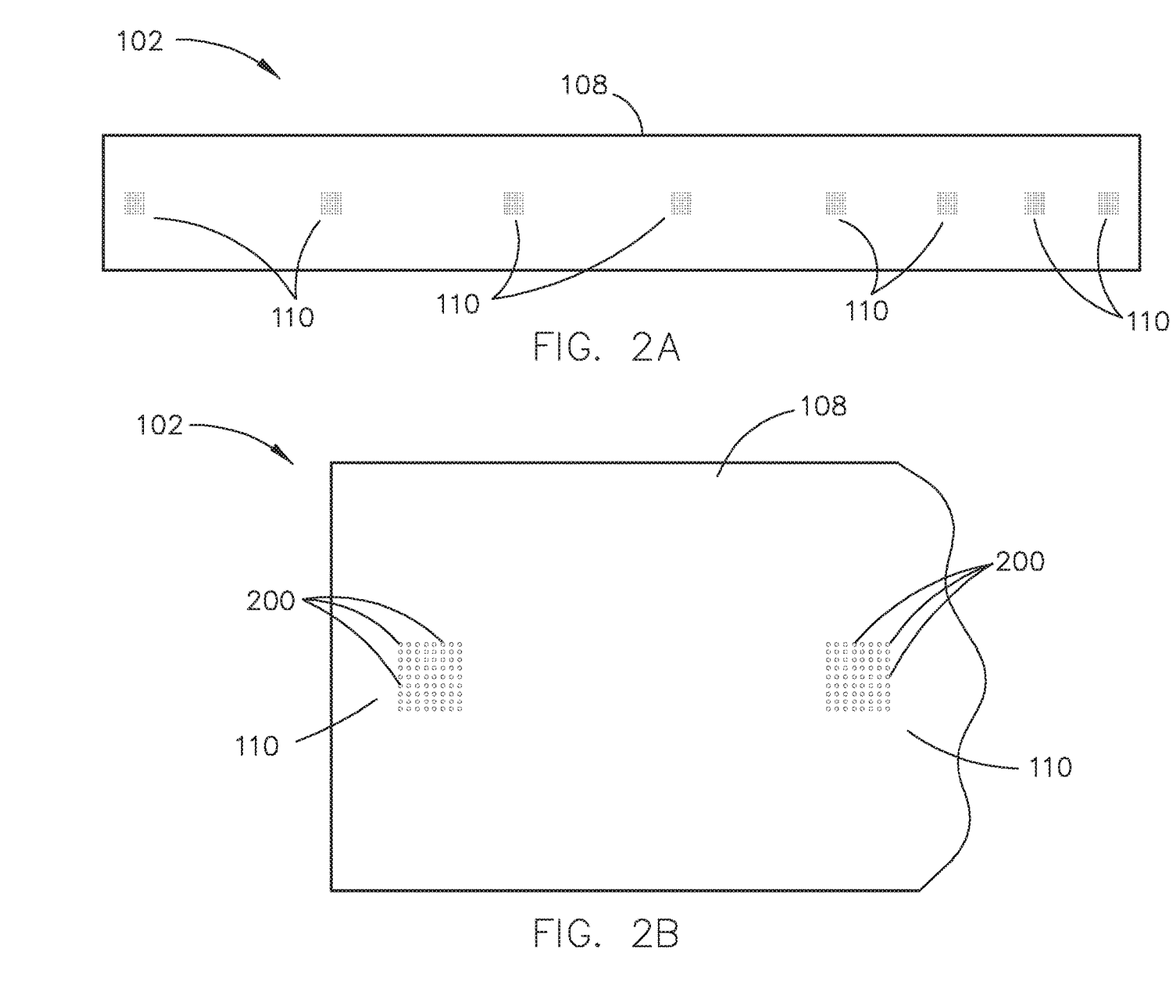
FIG. 2A schematically illustrates an aircraft winglet light assembly, in accordance with one or more embodiments of the disclosure.
FIG. 2B schematically illustrates a portion of an aircraft winglet light assembly, in accordance with one or more embodiments of the disclosure.

The aircraft winglet light assembly 102 may include an exterior skin 108. As illustrated in FIGS. 2A and 2B, the exterior skin 108 may include one or more sets 110 of one or more holes 200. For example, the exterior skin 108 may include at least three sets 110 of the one or more holes 200. For instance, the exterior skin 108 may include eight sets 110 of the one or more holes 200. The one or more sets 110 of the one or more holes 200 may be configured to allow illumination (or light) to pass through the exterior skin 108. It is noted herein that "illumination" and "light" may be considered equivalent, for purposes of the present disclosure.

Where there are multiple sets 110 of the one or more holes 200, the multiple sets 110 may be spaced unevenly. For example, the multiple sets 110 may be spaced unevenly along the length of the aircraft winglet light assembly 102. For instance, a first spacing between a first adjacent pair of the multiple sets 110 of the one or more holes 200 may be different from a second spacing between a second adjacent pair of the multiple sets 110 of the one or more holes 200. In this regard, the multiple sets 110 may include a proportionally-accelerating spacing along the length of the aircraft winglet light assembly 102, where the distance between adjacent sets 110 of the one or more holes 200 decreases along the length of the aircraft winglet light assembly 102 in the direction of (e.g., toward) a tip of the aircraft winglet 104. It is noted herein, however, that the multiple sets 110 of the one or more holes 200 may be evenly-spaced. In addition, it is noted herein that the multiple sets 110 of the one or more holes 200 may be proportionally decelerating along the length of the aircraft winglet light assembly 102, where the distance between adjacent sets 110 of the one or more holes 200 increases along the length of the aircraft winglet light assembly 102 in the direction of (e.g., toward) a tip of the aircraft winglet 104. Therefore, the above description should not be interpreted as a limitation on the present disclosure but merely an illustration.

The one or more holes 200 may be fabricated within the exterior skin 108 via one or more fabrication processes. For example, the one or more fabrication processes may include one or more drilling processes. For instance, the one or more drilling processes may include one or more micro-drilling processes. It is noted herein that micro-drilling may allow for illumination (or light) to pass through the exterior skin 108 while giving the exterior skin 108 a "dead face" appearance, or an appearance where the aircraft winglet 104 appears to be fabricated from solid sheet metal from a select or pre-defined distance, while still allowing for a defined pattern of illumination when an illumination source (e.g., illumination source 302 or 304 as illustrated in FIGS. 3A-4B) is activated.

The one or more fabrication processes for the one or more sets 110 of the one or more holes 200 may be subsequent to (e.g., be post-fabrication processes to) one or more fabrication processes implemented to fabricate the exterior skin 108. It is noted herein, however, that the exterior skin 108 and the one or more sets 110 of the one or more holes 200 may be fabricated via one or more simultaneous or substantially simultaneous fabrication processes. For example, the exterior skin 108 and the one or more sets 110 of the one or more holes 200 may be formed simultaneously or substantially simultaneously in a single fabrication process. Therefore, the above description should not be interpreted as a limitation on the present disclosure but merely an illustration.

The one or more holes 200 of a particular set 110 may be set in a select or pre-defined pattern that is dependent on a select or pre-defined brightness of illumination at a select or pre-defined distance from the aircraft winglet 104. For example, more frequent holes 200 (e.g., holes 200 that are more densely-packed within the pattern of the particular set 110) may allow more illumination to pass through the exterior skin 108. By way of another example, more frequent holes 200 (e.g., holes 200 that are more densely-packed within the pattern of the particular set 110) may allow a more homogenous illumination at the select or pre-defined distance from the aircraft winglet 104 after it passes through the exterior skin 108. The one or more sets 110 of the one or more holes 200 may be set in a similar or substantially similar pattern. It is noted herein, however, that at least some sets 110 of the one or more holes 200 may be set in a different pattern than other sets 110 of the one or more holes 200.

The one or more holes 200 may be of a select or pre-defined diameter that is dependent on at least one of a select or pre-defined pattern and/or a select or pre-defined brightness of illumination at a select or pre-defined distance from the aircraft winglet 104. For example, larger diameter holes 200 may allow more illumination to pass through the exterior skin 108. By way of another example, larger diameter holes 200 may allow a more homogenous illumination at the select or pre-defined distance from the aircraft winglet 104 after it passes through the exterior skin 108. The one or more holes 200 may be the similar or substantially similar diameter. Where there are multiple holes 200, at least some holes 200 of the multiple holes 200 may be of a different diameter than other holes 200 of the multiple holes 200.

It is noted herein that the select or pre-defined pattern may generate a signature brand element on the aircraft winglet 104 of an aircraft produced by a particular avionics manufacturer, which may be recognizable as a visual differentiator for purposes of aesthetic appeal to distinguish the aircraft for the particular avionics manufacturer from an aircraft produced by a different avionics manufacturer. In addition, it is noted herein that the select or pre-defined pattern may generate a signature brand element on the aircraft winglet 104 of an aircraft for a particular avionics consumer (e.g., airline, charter service, avionics service provider, or the like), which may be recognizable as a visual differentiator for purposes of aesthetic appeal to distinguish the aircraft in use by the particular avionics consumer from an aircraft in use by a different avionics consumer.

In addition, it is noted herein that the select or pre-defined brightness of illumination may be subject to the regulation and guidelines set forth in 14 C.F.R. § 25.1389, *Position light distribution and intensities*, as well as at least the sections referenced within 14 C.F.R. § 25.1389.

Referring again to FIG. 1, the aircraft winglet light assembly 102 may include one or more protection elements 112 proximate to the one or more sets 110 of the one or more holes 200. For example, a single protection element 112 may be configured to simultaneously or substantially simultaneously cover all of the one or more sets 110 of the one or more holes 200. By way of another example, the aircraft winglet light assembly 102 may include a protection element 112, including multiple sections, where each of the multiple sections of the protection element 112 may be configured to cover at least one of the one or more sets 110 of the one or more holes 200. For instance, a particular section of the protection element 112 may be configured to cover a particular set 110 of the one or more holes 200. By way of another example, the aircraft winglet light assembly 102 may include multiple protection elements 112, where each of the multiple protection elements 112 may be configured to cover at least one of the one or more sets 110 of the one or more holes 200. For instance, a particular protection element 112 may be configured to cover a particular set 110 of the one or more holes 200.

The one or more protection elements 112 may be fabricated from a transparent or translucent material, through which illumination from the one or more sets 110 of the one or more holes 200 may pass. For example, the one or more protection elements 112 may be a flexible cover including, but not limited to, a tape or other adhesive-backed flexible cover. For instance, the tape may include an aircraft exterior grade polyurethane tape. By way of another example, the one or more protection elements 112 may include a resin configured to at least partially fill the one or more holes 200.

It is noted herein that a flexible tape and/or a resin may be superior to a more rigid lens. The lens may require a sealant and/or a mechanical coupling mechanism to be affixed to the exterior skin 108, instead of a simple adhesive. The lens may need to be contoured to the aircraft winglet 104. For example, the contouring may include sharp bends. For instance, the sharp bends may refract emitted illumination. In addition, the sharp bends may be susceptible to abrasion and erosion from the Windstream during flight. The lens may also need to survive the harsh environments in the Windstream including, but not limited to, high dynamic flight stresses and differences in thermal expansion between the lens (e.g., which may be fabricated from a plastic) and the exterior skin 108 (e.g., which may be fabricated from a fiberglass or a metal including, but not limited to, aluminum). Flexure of the aircraft winglet 104 may render a lens unusable as a protection element 112, as the flexure may cause the lens to disengage from the exterior skin 108 of the aircraft winglet light assembly 102, to break, or the like.

The one or more protection elements 112 may serve as both erosion protection and abrasion protection for the one or more sets 110 of the one or more holes 200. The one or more protection elements 112 may prevent foreign object debris (FOD) from filling and/or blocking the one or more sets 110 of the one or more holes 200.

Referring now to FIGS. 3A-4B, one or more interior surfaces (e.g., of one or more walls) of the aircraft winglet light assembly 102 may define a cavity 300. The one or more sets 110 of the one or more holes 200 may lead into the cavity 300. The aircraft winglet light assembly 102 may include one or more illumination sources housed within the cavity 300. The one or more sets 110 of the one or more holes 200 may be configured to allow illumination from the one or more illumination sources to shine through the exterior skin 108.

Figure 3A:
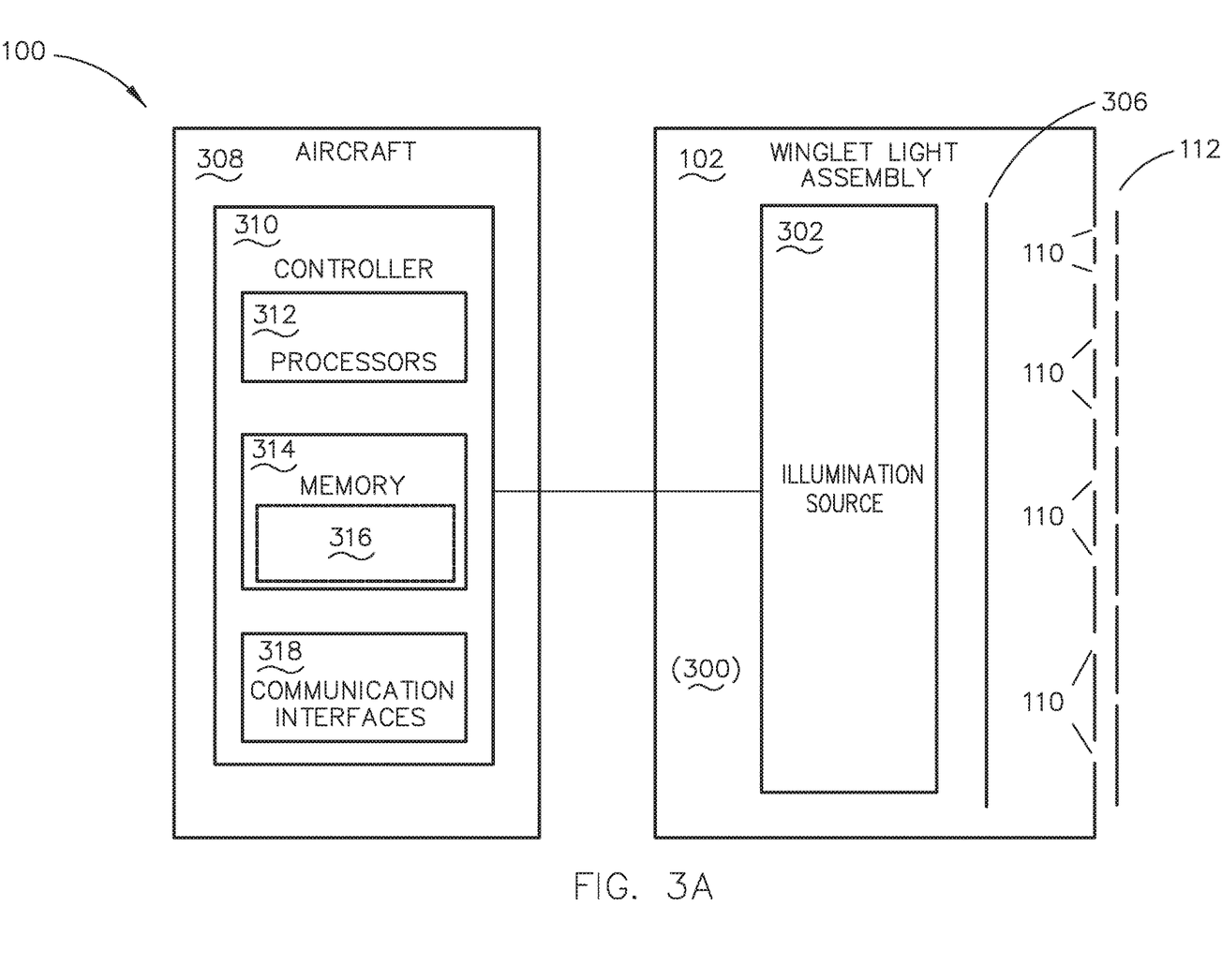
FIG. 3A is a block diagram illustrating a system including an aircraft winglet light assembly, in accordance with one or more embodiments of the disclosure.
Figure 4A:
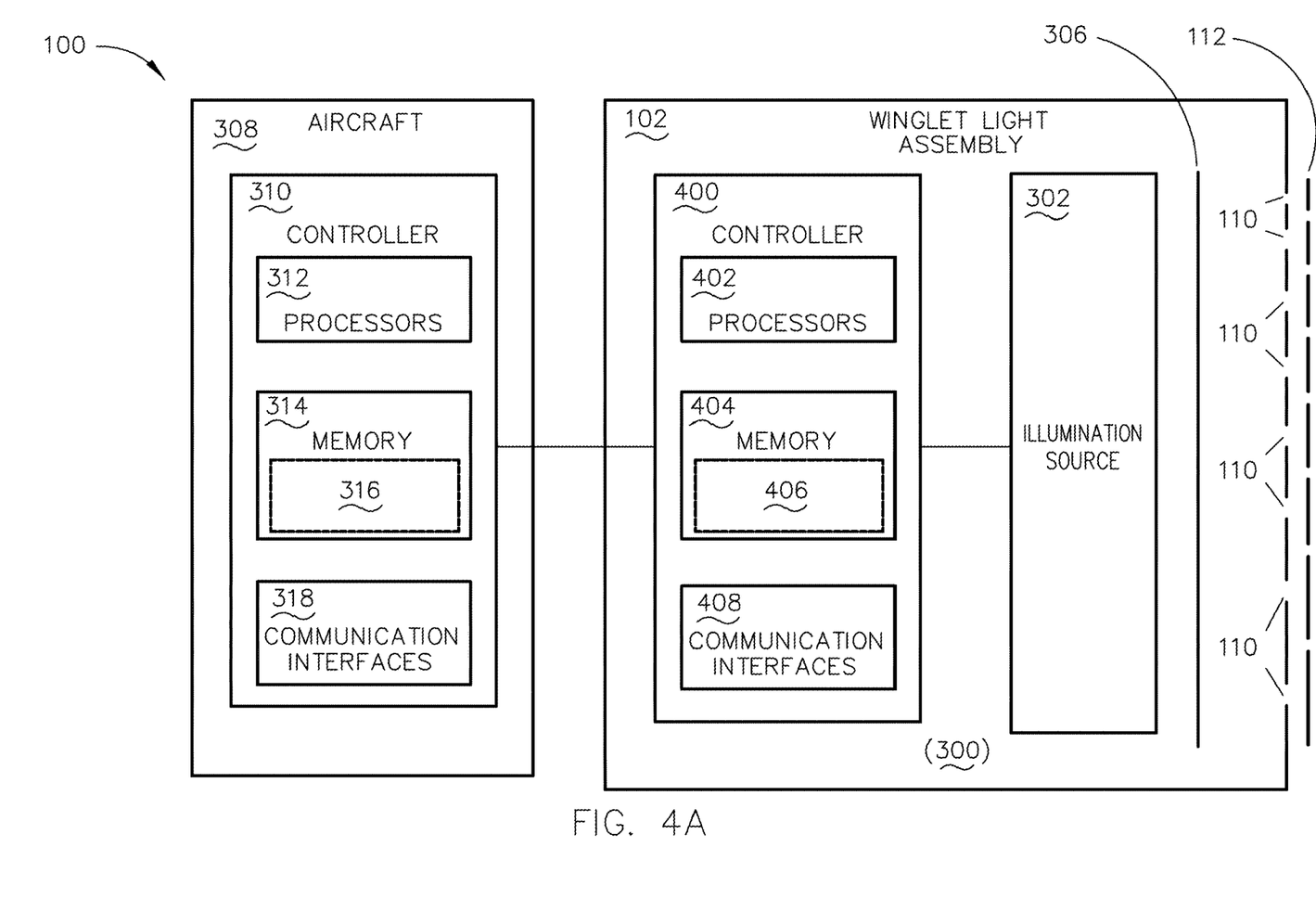
FIG. 4A is a block diagram illustrating a system including an aircraft winglet light assembly, in accordance with one or more embodiments of the disclosure.

As illustrated in FIGS. 3A and 4A, the aircraft winglet light assembly 102 may include a single illumination source 302 housed within the cavity 300. For instance, the single illumination source 302 may generate and direct illumination to all of the one or more sets 110 of the one or more holes 200 simultaneously or substantially simultaneously.

Figure 3B:
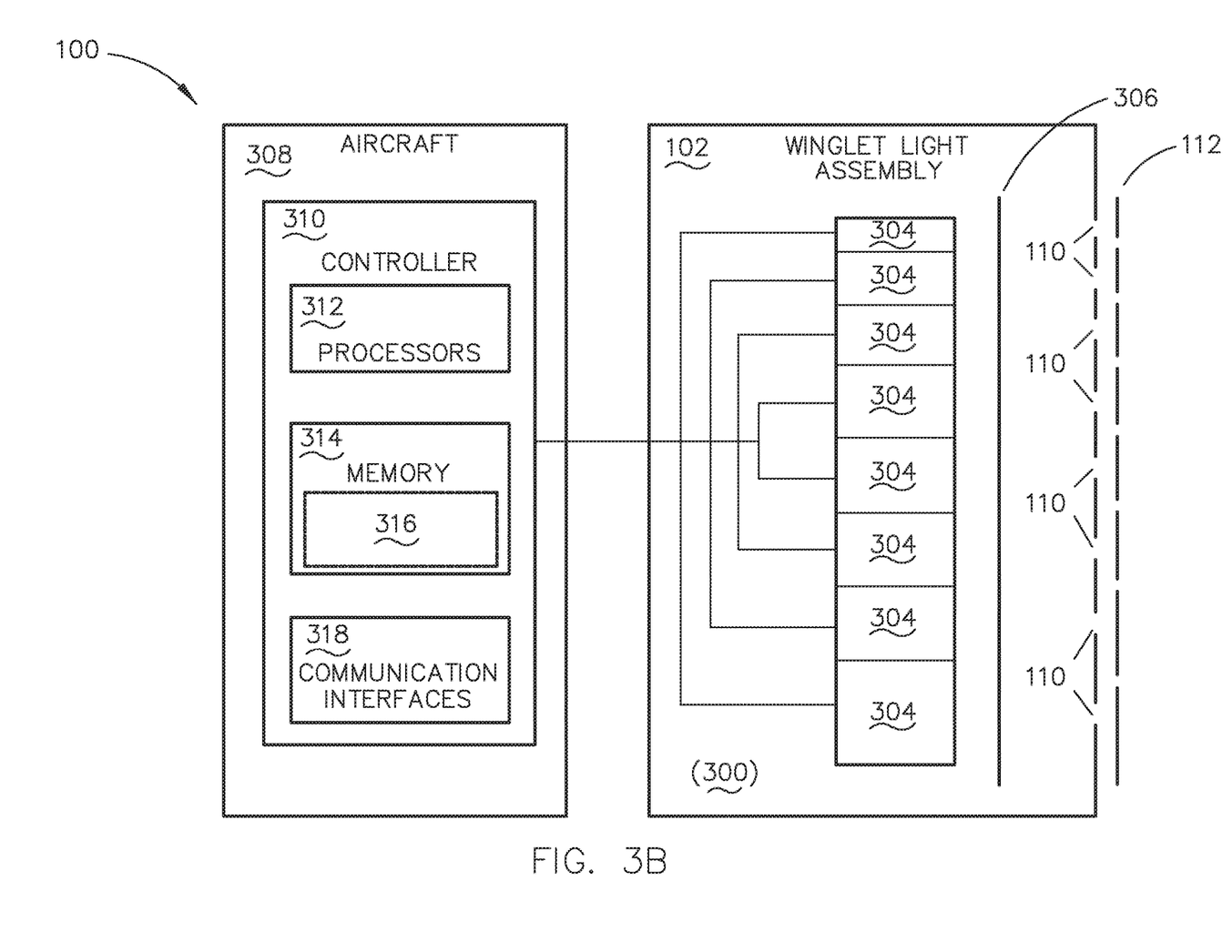
FIG. 3B is a block diagram illustrating a system including an aircraft winglet light assembly, in accordance with one or more embodiments of the disclosure.
Figure 4B:
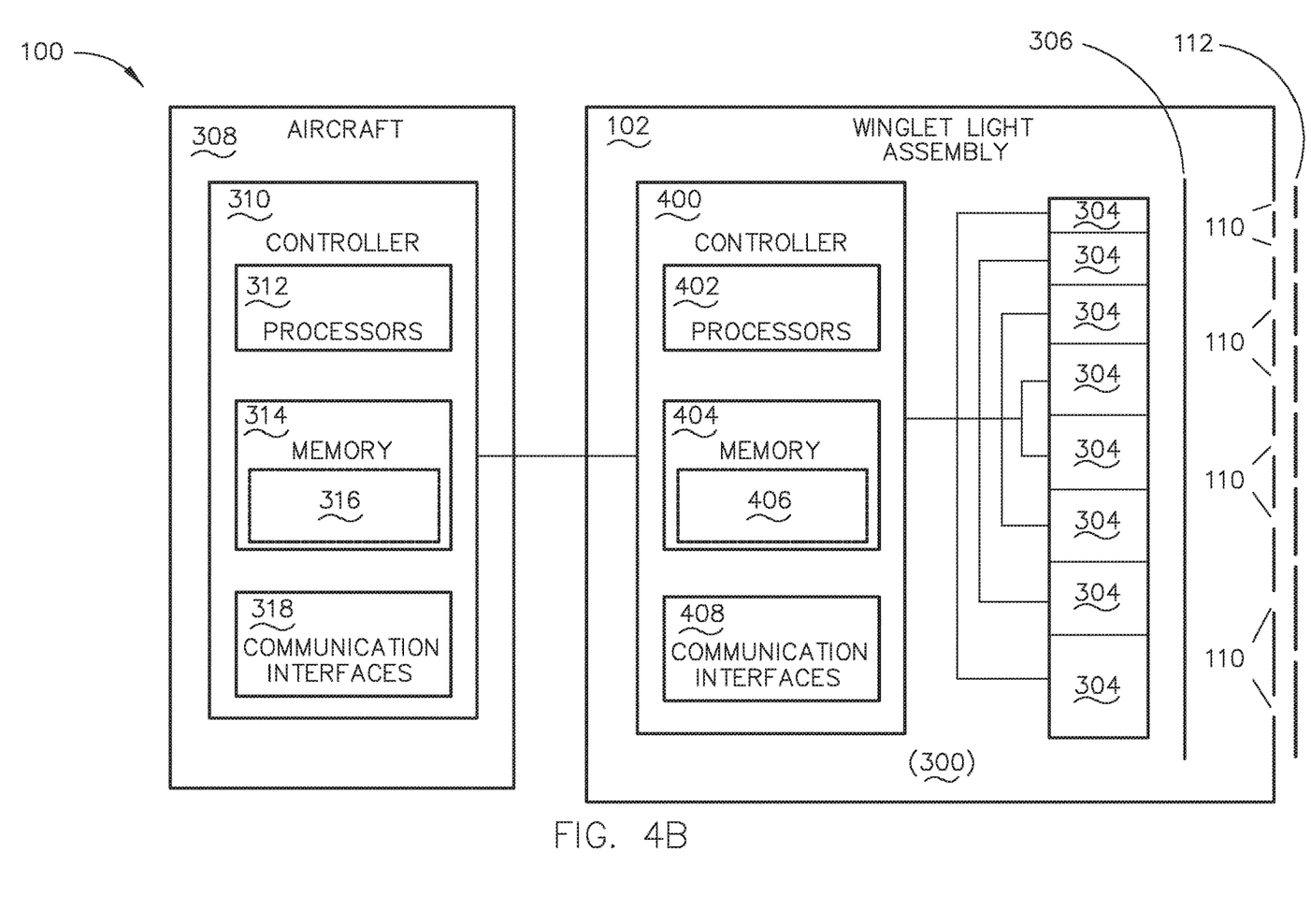
FIG. 4B is a block diagram illustrating a system including an aircraft winglet light assembly, in accordance with one or more embodiments of the disclosure.

As illustrated in FIGS. 3B and 4B, the aircraft winglet light assembly 102 may include multiple illumination sources 304 housed within the cavity 300, where each of the multiple illumination sources 304 may be configured to generate and direct illumination to at least one of the one or more sets 110 of the one or more holes 200. For instance, a particular illumination source 304 may be configured to generate and direct illumination to a particular set 110 of the one or more holes 200.

The aircraft winglet light assembly 102 may include one or more diffusion elements 306 positioned proximate to the illumination sources 302 or 304 within the cavity 300 defined by the exterior skin 108. For example, one or more diffusion elements 306 may be positioned between the illumination sources 302 or 304 and the one or more sets 110 of the one or more holes 200. The one or more diffusion elements 306 may be configured to homogenize illumination passing through the one or more sets 110 of the one or more holes 200. For example, the diffusion element 306 may include, but is not limited to, a diffusion film. The aircraft winglet assembly 102 may include a single diffusion element 306. It is noted herein, however, that the aircraft winglet light assembly 102 may include multiple diffusion elements 306, where each of the multiple diffusion elements 306 may be configured to diffuse illumination generated by at least one of the illumination sources 304. For example, a particular diffusion element 306 may be configured to diffuse illumination generated by a particular illumination source 304.

The aircraft winglet light assembly 102 may be coupled to an aircraft 308. The one or more illumination sources 302 or 304 may be coupled to a controller configured to at least one of activate or deactivate the one or more illumination sources 302 or 304.

As illustrated in FIGS. 3A and 3B, the illumination sources 302 or 304 may be coupled to a controller 310 housed within the aircraft 308. The controller 310 may include at least one of one or more processors 312, memory 314 configured to store one or more sets of program instructions 316, and/or one or more communication interfaces 318.

As illustrated in FIGS. 4A and 4B, the illumination sources 302 or 304 may be coupled to a controller 400 housed within the cavity 300 of the aircraft winglet light assembly 102, and the aircraft winglet light assembly 102 may be coupled to the controller 310 within the aircraft 308. The controller 400 may include at least one of one or more processors 402, memory 404 configured to store one or more sets of program instructions 406, and/or one or more communication interfaces 408.

The one or more processors 312 or 402 provides processing functionality for at least the controller 310 or 400 and may include any number of processors, micro-controllers, circuitry, field programmable gate array (FPGA) or other processing systems, and resident or external memory for storing data, executable code, and other information accessed or generated by the controller 310 or 400. The one or more processors 312 or 402 may execute one or more software programs (e.g., the one or more sets of program instructions 316 or 406) embodied in a non-transitory computer readable medium (e.g., the memory 314 or 404) that implement techniques described herein. The one or more processors 312 or 402 are not limited by the materials from which it is formed or the processing mechanisms employed therein and, as such, may be implemented via semiconductor(s) and/or transistors (e.g., using electronic integrated circuit (IC) components), and so forth.

The memory 314 or 404 may be an example of tangible, computer-readable storage medium that provides storage functionality to store various data and/or program code associated with operation of the controller 310 or 400 and/or one or more processors 312 or 402, such as software programs and/or code segments, or other data to instruct the one or more processors 312 or 402 and/or other components of the controller 310 or 400, to perform the functionality described herein. Thus, the memory 314 or 404 may store data, such as a program of instructions for operating the controller 310 or 400, including its components (e.g., one or more processors 312 or 402, the one or more communication interfaces 318 or 408, or the like), and so forth. It should be noted that while a single memory 314 or 404 is described, a wide variety of types and combinations of memory (e.g., tangible, non-transitory memory) may be employed. The memory 314 or 404 may be integral with the one or more processors 312 or 402, may include stand-alone memory, or may be a combination of both. Some examples of the memory 314 or 404 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more communication interfaces 318 or 408 may be operatively configured to communicate with components of the controller 310 or 400. For example, the one or more communication interfaces 318 or 408 may be configured to retrieve data from the one or more processors 312 or 402 or other devices, transmit data for storage in the memory 314 or 404, retrieve data from storage in the memory 314 or 404, and so forth. The one or more communication interfaces 318 or 408 may also be communicatively coupled with the one or more processors 312 or 402 to facilitate data transfer between components of the controller 310 or 400 and the one or more processors 312 or 402. It should be noted that while the one or more communication interfaces 318 or 408 is described as a component of the controller 310 or 400, one or more components of the one or more communication interfaces 318 or 408 may be implemented as external components communicatively coupled to the controller 310 or 400 via a wired and/or wireless connection. The controller 310 or 400 may also include and/or connect to one or more input/output (I/O) devices. In embodiments, the one or more communication interfaces 318 or 408 includes or is coupled to a transmitter, receiver, transceiver, physical connection interface, or any combination thereof.

The one or more communication interfaces 318 or 408 may be operatively configured to communicate with one or more data input devices. The one or more communication interfaces 318 or 408 may be operatively configured to communicate with components of one or more display devices. The one or more data input devices and the one or more display devices may be components of one or more user interfaces. The controller 310 or 400 and the one or more user interfaces may be separate components (e.g., have separate housings and/or separate chassis). It is noted herein, however, that the controller 310 or 400 and the one or more user interfaces may be components integrated in a single housing and/or on a single chassis.

The controller 310 or 400 may be configured to perform one or more process steps, as defined by the one or more sets of program instructions 316 or 406.

In some steps, the one or more sets of program instructions 316 or 406 may be configured to cause the controller 310 or 400 to activate the illumination source 302.

In some steps, the one or more sets of program instructions 316 or 406 may be configured to cause the controller 310 or 400 to activate one or more of the multiple illumination sources 304 simultaneously or substantially simultaneously.

In some steps, the one or more sets of program instructions 316 or 406 may be configured to cause the controller 310 or 400 to activate one or more of the multiple illumination sources 304 in a select or pre-defined pattern. For example, the select or pre-defined pattern may include sequential blinking or flashing along the length of the aircraft winglet light assembly 102.

In some steps, the one or more sets of program instructions 316 or 406 may be configured to cause the controller 310 or 400 to activate one or more of the multiple illumination sources 304 in a select configuration or arrangement. By way of another example, the select configuration or arrangement may include lighting select illumination sources of the multiple illumination sources 304 to transmit data or information to an operator of the aircraft 308.

It is noted herein that the illumination source 302 and/or one or more of the multiple illumination sources 304 may be activated for any of a number of possible uses. For example, the illumination source 302 and/or one or more of the multiple illumination sources 304 may be activated to generate and direct illumination for use as a visual differentiator for purposes of aesthetic appeal, as a turn signal, a sensor-based wingtip proximity warning, a diagnostic information indicator, or the like.

The one or more process steps described above may be performed iteratively, concurrently, and/or sequentially. The one or more sets of program instructions 316 or 406 are not limited to the process steps provided. For example, the one or more sets of program instructions 316 or 406 may instead include more or fewer processes. By way of another example, the one or more sets of program instructions 316 or 406 may perform the process steps in an order other than provided. Therefore, the above description should not be interpreted as a limitation on the scope of the present disclosure, but merely an illustration.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to, one or more of the steps disclosed herein.

Referring now to FIGS. 5A-6B, the system 100 may include one or more coated areas of (or coatings of) electroluminescent (EL) paint. For example, the one or more coated areas of electroluminescent paint may be located on at least a portion of an exterior surface of the aircraft winglet 104. For instance, the electroluminescent paint may be located on an upward-facing exterior surface of the aircraft winglet 104. By way of another example, the one or more coated areas of the electroluminescent paint may be located on at least a portion of an exterior surface of the aircraft winglet 104 and on at least a portion of the exterior skin 108.

The one or more coated areas of electroluminescent paint may be proximate to and/or extend from the one or more protection elements 112. By way of another example, the one or more coated areas of electroluminescent paint may be proximate to and/or extend from the one or more sets 110 of the one or more holes 200 underneath the one or more protection elements 112.

Where there are multiple coated areas of electroluminescent paint located on the at least a portion of the exterior surface of the aircraft winglet 104, a select or pre-defined pattern of a particular coated area of electroluminescent paint may be contoured to map to a select or pre-defined pattern of an adjacent coated area of electroluminescent paint. It is noted herein, however, that at least one of the multiple coated areas of electroluminescent paint may include a select or pre-defined pattern that is different or independent from other coated areas of electroluminescent paint located on the at least the portion of the exterior surface of the aircraft winglet 104.

The one or more coated areas of electroluminescent paint may be in any set in any select or pre-defined pattern known in the art. For example, the one or more coated areas of electroluminescent paint may be patterned in one or more spots, bands, or the like.

Figure 5A:
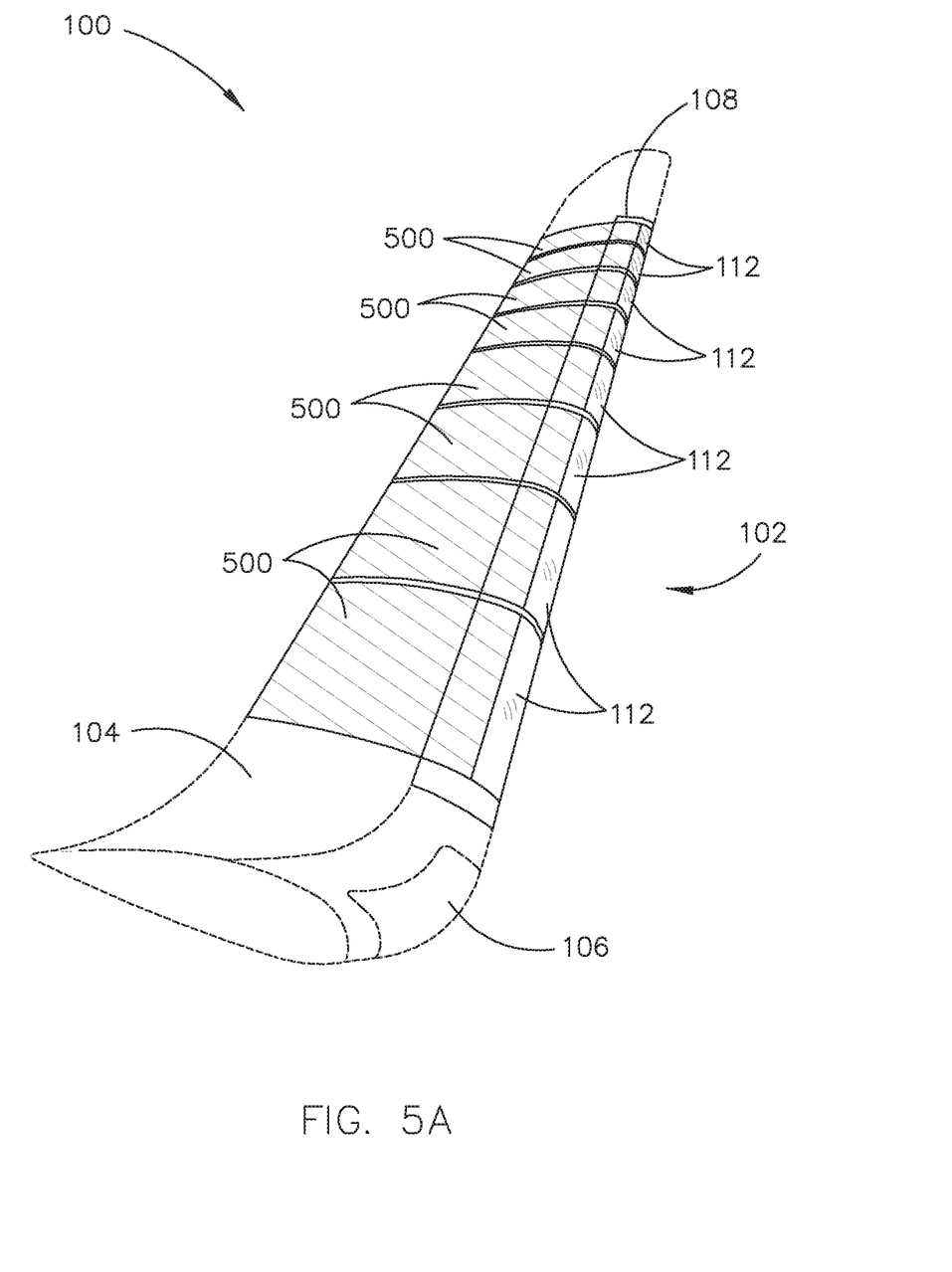
FIG. 5A is a perspective view of a system including an aircraft winglet light assembly, in accordance with one or more embodiments of the disclosure.
Figure 5B:
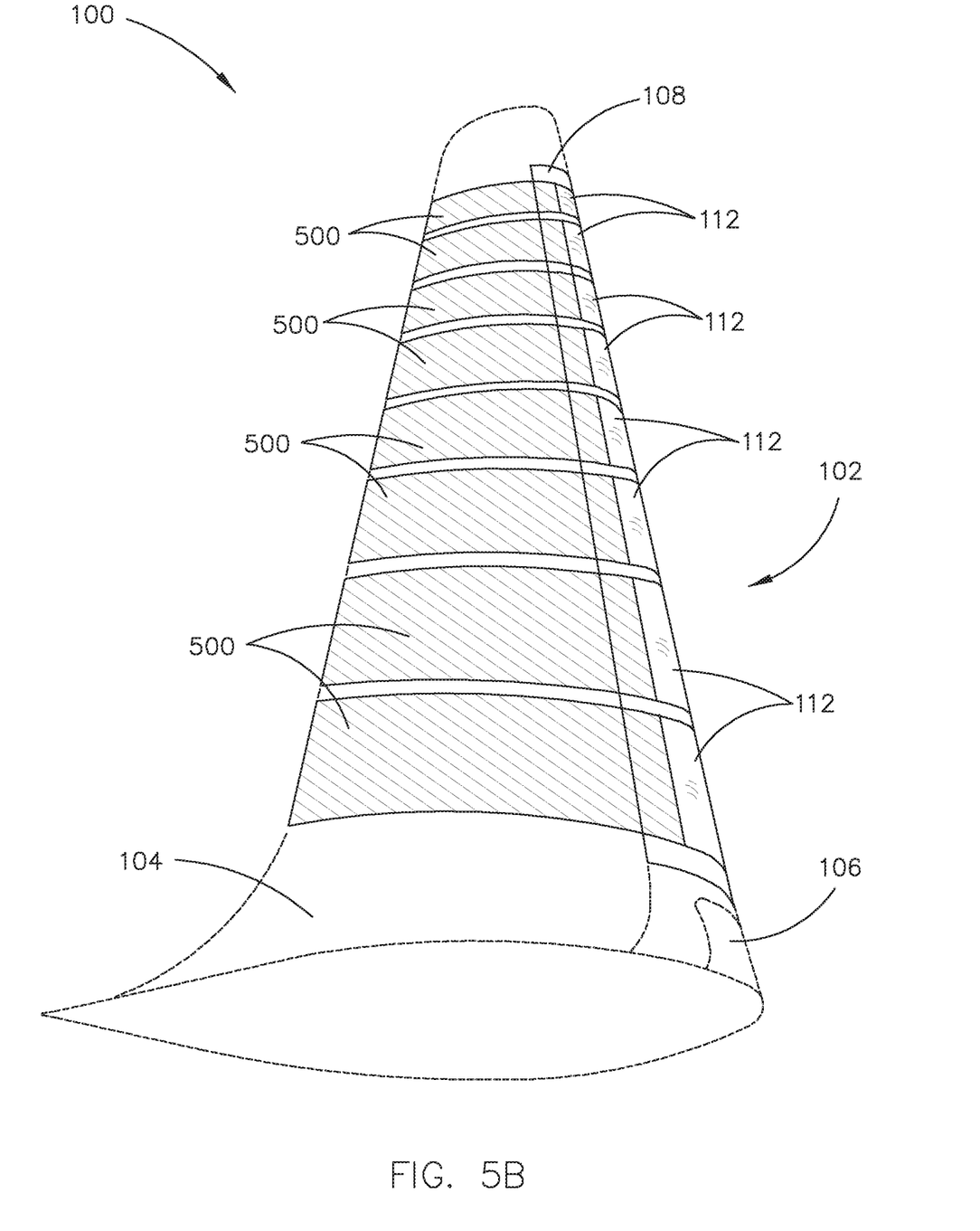
FIG. 5B is a side plan view of a system including an aircraft winglet light assembly, in accordance with one or more embodiments of the disclosure.

As illustrated in FIGS. 5A and 5B, the system 100 may include one or more electroluminescent paint bands 500 set in a select or pre-defined pattern on the aircraft winglet 104. The one or more electroluminescent paint bands 500 may be a constant or substantially constant height across the width of the aircraft winglet 104, where height is defined along the length of the aircraft winglet light assembly 102. A height of a particular electroluminescent paint band 500 may be dependent on the height of a particular protection element 112 (or a particular section of a protection element 112). For example, the height of the particular electroluminescent paint band 500 may decrease as the height of the particular protection element 112 (or the particular section of a protection element 112) decreases.

At some location across the width of the aircraft winglet 104, the height of a particular electroluminescent paint band 500 may be dependent on the height of a particular protection element 112 (or a particular section of a protection element 112), where height is defined along the length of the aircraft winglet light assembly 102. For example, the height of the particular electroluminescent paint band 500 may be equal or substantially equal to the height of the particular protection element 112 (or the particular section of a protection element 112) at some location across the width of the aircraft winglet 104.

Figure 6A:
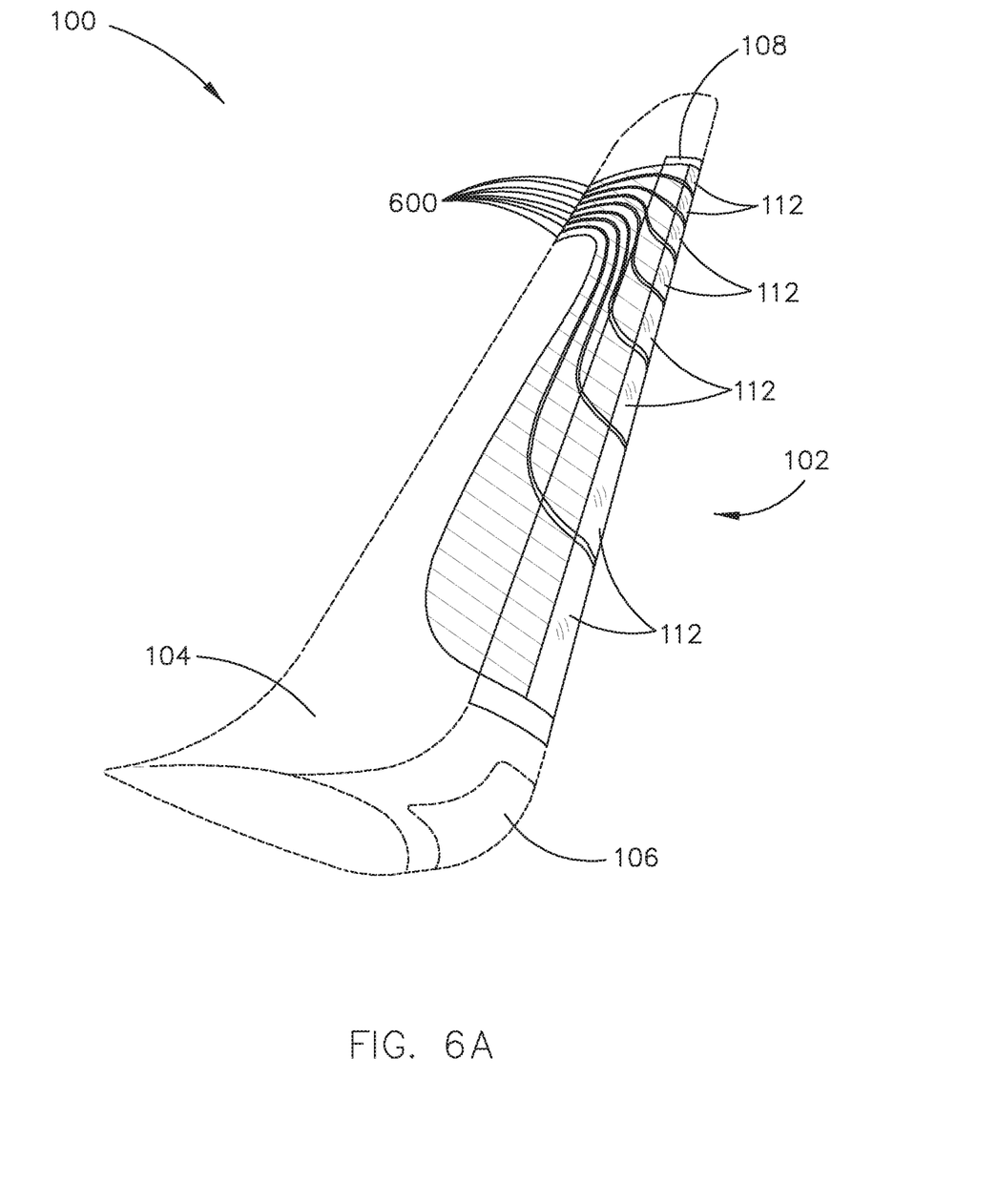
FIG. 6A is a perspective view of a system including an aircraft winglet light assembly, in accordance with one or more embodiments of the disclosure.
Figure 6B:
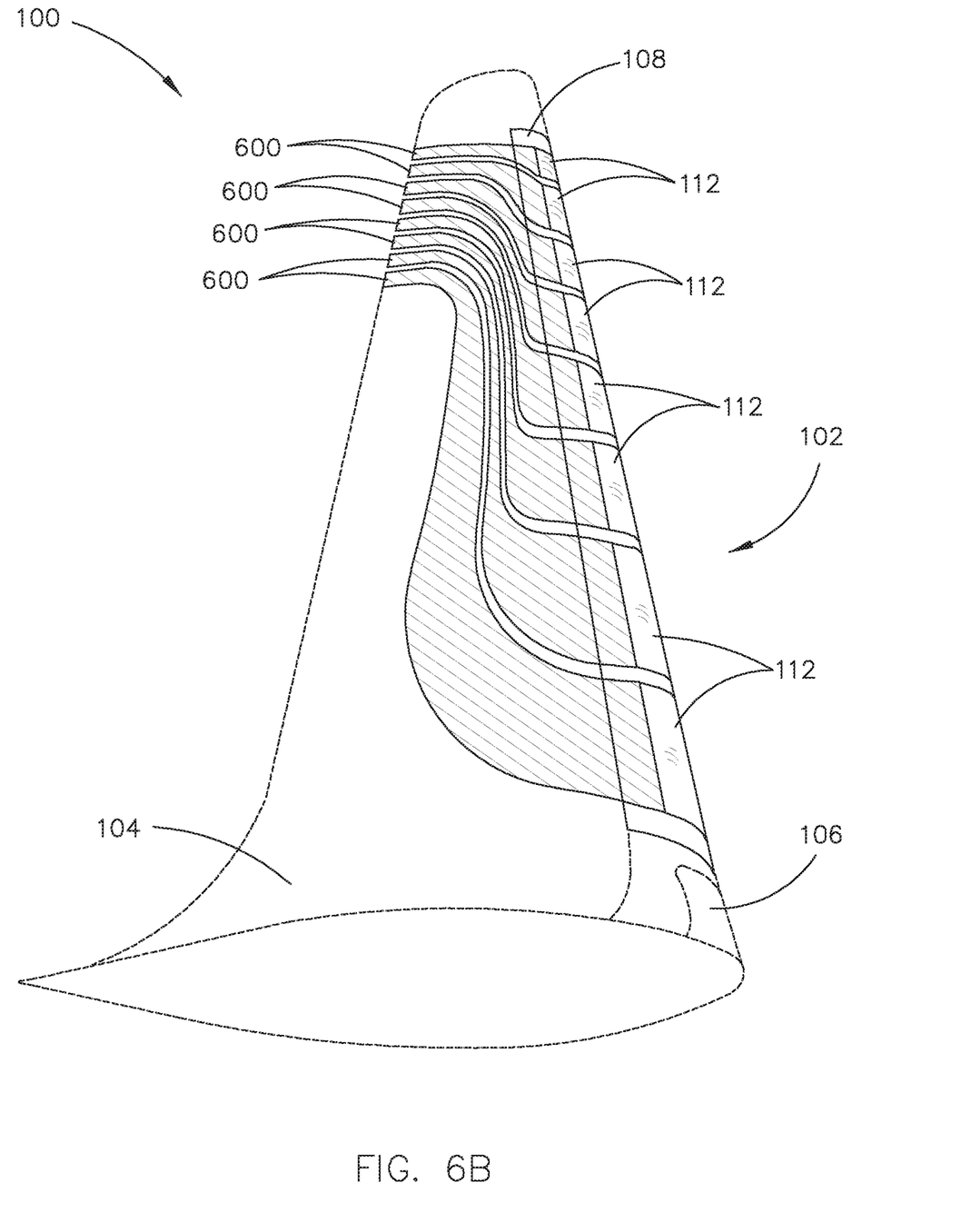
FIG. 6B is a side plan view of a system including an aircraft winglet light assembly, in accordance with one or more embodiments of the disclosure.

As illustrated in FIGS. 6A and 6B, the system 100 may include one or more electroluminescent paint bands 600 set in a select or pre-defined pattern on the aircraft winglet 104. The one or more electroluminescent paint bands 600 may be defined by a particular pattern (e.g., an ornamental design) across the width of the aircraft winglet 104. For example, a particular electroluminescent paint band 600 may be defined by a particular pattern that conforms or substantially conforms to at least an adjacent pattern of at least an adjacent electroluminescent paint band 600. By way of another example, the particular electroluminescent paint band 600 may be defined by a particular pattern that is free-form with respect to (e.g., unrelated or substantially unrelated in design to) at least an adjacent pattern of at least an adjacent electroluminescent paint band 600.

The one or more electroluminescent paint bands 500, 600 may be a signature brand element on the aircraft winglet 104 of an aircraft produced by a particular avionics manufacturer, which may be recognizable as a visual differentiator for purposes of aesthetic appeal to distinguish the aircraft for the particular avionics manufacturer from an aircraft produced by a different avionics manufacturer. In addition, it is noted herein that the one or more electroluminescent paint bands 500, 600 may be a signature brand element on the aircraft winglet 104 of an aircraft for a particular avionics consumer (e.g., airline, charter service, avionics service provider, or the like), which may be recognizable as a visual differentiator for purposes of aesthetic appeal to distinguish the aircraft in use by the particular avionics consumer from an aircraft in use by a different avionics consumer.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft winglet light assembly, comprising:
   an exterior skin coupled to an aircraft winglet of an aircraft, at least one interior surface of the exterior skin defining a cavity within the exterior skin;
   one or more illumination sources housed within the cavity;
   one or more sets of holes within the exterior skin, the one or more sets of holes configured to allow illumination generated by the one or more illumination sources to pass through the exterior skin; and
   one or more protection elements proximate to the one or more sets of holes.

2. The aircraft winglet light assembly of claim 1, further comprising:
   one or more coated areas of electroluminescent paint.

3. The aircraft winglet light assembly of claim 2, wherein at least a portion of an exterior surface of the aircraft winglet is covered in the one or more coated areas of electroluminescent paint.

4. The aircraft winglet light assembly of claim 3, wherein the one or more coated areas of electroluminescent paint extend from the one or more sets of holes along the exterior surface of the aircraft winglet.

5. The aircraft winglet light assembly of claim 2, wherein at least a portion of an exterior surface of the aircraft winglet and at least a portion of the exterior skin is covered in the one or more coated areas of electroluminescent paint.

6. The aircraft winglet light assembly of claim 2, wherein the one or more coated areas of electroluminescent paint comprise at least two coated areas of electroluminescent paint.

7. The aircraft winglet light assembly of claim 6, wherein a first coated area of the at least two coated areas of electroluminescent paint is contoured to map to a second coated area of the at least two coated areas of electroluminescent paint.

8. The aircraft winglet light assembly of claim 2, wherein the one or more coated areas of electroluminescent paint are proximate to the one or more protection elements.

9. The aircraft winglet light assembly of claim 1, wherein the one or more sets of holes within the exterior skin comprise at least three sets of holes.

10. The aircraft winglet light assembly of claim 9, wherein a first spacing between a first adjacent pair of the at least three sets of holes within the exterior skin is different from a second spacing between a second adjacent pair of the at least three sets of holes within the exterior skin.

11. The aircraft winglet light assembly of claim 1, wherein the one or more sets of holes are fabricated in a pre-defined pattern.

12. The aircraft winglet light assembly of claim 1, wherein a particular section of at least one section of a protection element of the one or more protection elements is configured to cover a particular set of the one or more sets of holes.

13. The aircraft winglet light assembly of claim 1, wherein the one or more protection elements comprise a tape configured to cover the one or more sets of holes.

14. The aircraft winglet light assembly of claim 1, further comprising:
   at least one diffusion element positioned proximate to the one or more illumination sources within the cavity defined by the exterior skin.

15. The aircraft winglet light assembly of claim 14, wherein the at least one diffusion element is positioned between the one or more illumination sources and the one or more sets of holes within the cavity defined by the exterior skin.

16. The aircraft winglet light assembly of claim 1, wherein the one or more illumination sources are coupled to a controller, wherein the controller is configured to at least one of activate or deactivate the one or more illumination sources.

17. A system, comprising:
   an aircraft winglet of an aircraft;
   an aircraft winglet light assembly, comprising:
      an exterior skin coupled to the aircraft winglet of the aircraft, at least one interior surface of the exterior skin defining a cavity within the exterior skin;
      one or more illumination sources housed within the cavity;
      one or more sets of holes within the exterior skin, the one or more sets of holes configured to allow illumination generated by the one or more illumination sources to pass through the exterior skin; and
      one or more protection elements proximate to the one or more sets of holes; and
   one or more coated areas of electroluminescent paint, at least a portion of at least one of an exterior surface of the aircraft winglet or the exterior skin being covered in the one or more coated areas of electroluminescent paint.

18. The system of claim 17, further comprising:
   a controller coupled to the one or more illumination sources of the aircraft winglet light assembly, wherein the controller is configured to at least one of activate or deactivate the one or more illumination sources.

19. A system, comprising:
   an aircraft winglet of an aircraft;
   an aircraft winglet light assembly, comprising:
      an exterior skin coupled to the aircraft winglet of the aircraft, at least one interior surface of the exterior skin defining a cavity within the exterior skin;
      one or more illumination sources housed within the cavity;
      one or more sets of holes within the exterior skin, the one or more sets of holes configured to allow illumination generated by the one or more illumination sources to pass through the exterior skin; and
      one or more protection elements proximate to the one or more sets of holes; and
   a controller coupled to the one or more illumination sources of the aircraft winglet light assembly, the controller configured to at least one of activate or deactivate the one or more illumination sources.

20. The system of claim 19, further comprising:
   one or more coated areas of electroluminescent paint, at least a portion of at least one of an exterior surface of the aircraft winglet or the exterior skin being covered in the one or more coated areas of electroluminescent paint.

* * * * *